Patented Sept. 3, 1946

2,406,869

UNITED STATES PATENT OFFICE 2,406,869

CATALYST PREPARATION

John D. Upham, Bartlesville, Okla., assignor to Phillips Petroleum Company, a corporation of Delaware No Drawing. Application August 18, 1942, Serial No. 455,241

7 Claims. (Cl. 252—211)

This invention relates to the manufacture of catalysts, and more particularly catalysts comprising or consisting essentially of normally solid or liquid, i. e. non-gaseous halides of the Friedel-Crafts type, namely, non-gaseous halides of polyvalent metals and metalloids. Still more particularly it relates to the manufacture of catalysts of the foregoing type which are supported on an inert adsorbent carrier material.

The principal object of this invention is to provide an improved process of making a catalyst of the Friedel-Crafts type. Another object is to provide an improved process of preparing a supported catalyst of the Friedel-Crafts type. Another object is to provide an improved method of making an aluminum chloride catalyst in highly active powdered form. Still another object is to make a supported aluminum chloride catalyst in an improved manner. Numerous other objects will more fully hereinafter appear.

Catalysts prepared in accordance with my invention may be used for catalyzing any reaction which has heretofore been catalyzed with normally solid or liquid halides of the Friedel-Crafts type, such as isomerization, for example, conversion of normal paraffins to isoparaffins, such as normal butane to isobutane, cracking, reforming, polymerization, alkylation, for example, alkylation of isoparaffins with olefins such as of isobutane with butene to give isooctane, alkylation of aromatics with olefins such as of benzene with ethylene to give ethylbenzene which is an intermediate in the manufacture of styrene, condensation, arylation, reactions of the Friedel-Crafts type, etc.

The halides which are employed as the active component of the catalysts of my invention are the normally non-gaseous halides of polyvalent metals and metalloids which are of the Friedel-Crafts type. Examples are the normally liquid or solid fluorides, chlorides, bromides or iodides of aluminum, zinc, tin, arsenic, antimony, zirconium, beryllium, titanium, iron, molybdenum, boron, etc. Usually the normally solid halides of polyvalent metals, the hydroxides of which are amphoteric, and especially of aluminum, are preferred.

In accordance with my invention, in a typical embodiment, a solution of the anhydrous metal or metalloid halide in a liquid anhydrous hydrogen halide, such as liquefied hydrogen fluoride, chloride, bromide or iodide may first be prepared preferably by dissolution of the anhydrous metal or metalloid halide in the liquid hydrogen halide. Preferably the solution so formed is saturated or substantially so, with respect to the dissolved metal halide in order to reduce the expense of preparation of the catalyst.

With this solution may be admixed a solid adsorbent particulate porous carrier material, such as charcoal, activated carbon, fuller's earth, activated clay, bauxite, Activated Alumina, silica gel, kieselguhr, pumice, etc. Alternatively the carrier material may have been admixed with the liquid hydrogen halide prior to dissolution of the metal or metalloid halide.

The proportions of the solution and the carrier material relative to one another may vary within wide limits from the point where the carrier is incompletely saturated, that is, is in excess, to the point where the carrier amounts to say only 25% by weight of the solution. The relative proportions of solution and carrier are chosen to give a finished catalyst containing any desired proportion of metal or metalloid halide on the carrier.

The carrier material may be either coarse or finely divided, and preferably of not over 100 mesh size ranging therefrom down to 300 mesh. It is preferred in many reactions to use the catalyst in the form of a suspension or slurry. In other cases the catalyst is suspended or floated in a gaseous medium. For such reactions the carrier particles should be extremely fine in size. In some cases the catalyst is used in the form of lumps or large granules packed into a reaction tower, the liquid or gaseous reaction stream being passed thereto. My invention may also be practiced using such large lumps of carrier.

The temperature at which the foregoing operations are conducted may be atmospheric or may be substantially thereabove. However, the temperature must not be above the critical temperature of the pure hydrogen halide or of the solution of metal halide therein. In practice it will be desirable to stay below the critical temperatures of the pure hydrogen halides which are as follows:

| | ° C. |
|---|---|
| Hydrogen fluoride | 230.2 |
| Hydrogen chloride | 51.4 |
| Hydrogen bromide | 90.0 |
| Hydrogen iodide | 151.0 |

The pressure during these steps of the process will be at least sufficient to maintain the hydrogen halide in liquid phase. This will depend upon the temperature and may range from atmospheric where the temperature is below the boiling point of the pure hydrogen halide or of the solution obtained up to the critical pressure of the pure hydrogen halide or of the solution or higher but seldom above 100 atmospheres. The critical pressures of the several hydrogen halides are:

| | Atmospheres |
|---|---|
| Hydrogen fluoride | 90 |
| Hydrogen chloride | 81.6 |
| Hydrogen bromide | 84 |
| Hydrogen iodide | 82 |

Ordinarily the carrier material and the solution of metal or metalloid halide in the liquid or liquefied hydrogen halide are thoroughly mixed with one another as by vigorous agitation so as to effect impregnation of the carrier with the solution. Other methods of effecting contact and impregnation may be employed, however. For example the carrier may be sprayed with the solution in any desired manner, as by exposing a layer of carrier agitated to continuously expose fresh surfaces as in a rotating drum or cylinder while spraying the solution thereon, or by intimately dispersing both carrier and droplets of solution with one another in a suitable gaseous medium. The method of impregnation may be analogous to spray drying. Thus, a cloud or suspension of the carrier in a suitable gaseous medium may be sprayed with the solution in such manner that the solution coats and impregnates the carrier particles.

If desired the carrier may have been previously treated in such a manner as to promote more rapid and more thorough contact, wetting, and impregnation with the hydrogen halide solution. For example it may have been evacuated to remove the air, and kept under vacuum until the time of contact with the solution. Alternatively the air may have been displaced with a gas which is soluble in or wetted by the solution, preferably a hydrogen halide, as by sweeping with such a gas, evacuating the carrier and then contacting with the gas, or in any other way. For example, in an especially suitable mode of operation, the carrier may be heated to an elevated temperature and then cooled in an atmosphere of hydrogen halide gas whereby the pores of the carrier are substantially filled with said gas. The carrier may be treated or impregnated with any other material which facilitates the wetting of the carrier by the solution. Certain solids or liquids may have this wetting power.

Another mode of effecting rapid impregnation is to heat the carrier to drive off the air and to contact while hot with the solution and allow the carrier to cool while thus in contact with the solution, thereby forcibly drawing the solution into the pores.

Since the solution is maintained and the contacting step is ordinarily carried out under elevated pressure sufficient to hold the hydrogen halide under pressure, this pressure aids in forcing the solution into the pores of the carrier. If desired this action may be accentuated by varying the pressure or effecting alternate increase and decrease in the extraneous pressure applied throughout the impregnation step as by intermittent application of additional pressure, or by alternate release and application of high pressure, or by alternate evacuation and application of high pressure. For example, a piston and cylinder may be arranged with the space above the piston connected to the contacting zone and the piston alternately retracted and advanced to effect the desired periodic fluctuations in pressure.

During or following impregnation of the carrier with the solution, and in the latter case either immediately or after lapse of a sufficient period of time to allow soaking of the solution into the pores of the carrier, the hydrogen halide is volatilized from the mixture to effect precipitation of the metal or metalloid halide in solid or liquid form, as the case may be, within the pores of the carrier. This vaporization of hydrogen halide and consequent deposition of the metal halide upon the carrier may be brought about by the release of pressure to a suitable figure or the elevation of the temperature to a suitable level, or by both of these measures. The selection of pressure and temperature to accomplish this result will be well within the skill of the art in the light of this disclosure.

If in the contacting step the carrier is at a temperature above the boiling point under the prevailing pressure, this causes vaporization of a portion of the hydrogen halide and partial precipitation of the metal or metalloid halide. Likewise if the pressure prevailing in this step is below that upon the solution and the level necessary to keep the hydrogen halide in liquid form, this effects vaporization of some hydrogen halide. Or, both higher temperature and lower pressure may bring about some precipitation. Usually, however, it will be desirable to effect additional volatilization and precipitation by subsequently elevating the temperature and/or releasing the pressure in the manner described in the preceding paragraph.

Generally, all or substantially all of the hydrogen halide solvent is volatilized so that all or substantially all of the dissolved solid or liquid halide is precipitated upon the carrier. However, a small amount of residual hydrogen halide may be left in the product to act as promoter in the reaction catalyzed therewith; usually such residual hydrogen halide will not exceed 5% by weight based on the weight of the metal or metalloid halide. Such hydrogen halide will be very intimately distributed throughout the precipitated metal or metalloid halide.

Occasionally use of a carrier described above may be dispensed with and the solution of normally solid metal halide in the hydrogen halide simply treated in such manner, for example, by spray drying, as to volatilize the hydrogen halide solvent in substantial entirety and precipitate the solid halide in finely divided form. Such pulverulent solid metal halide has an unusually high activity, much greater than that of conventional powdered metal halide.

The product of the foregoing process should be stored in an inert atmosphere until use, for example, in moistureproof receptacles in which a dry inert gaseous atmosphere such as nitrogen, hydrogen halide, etc. is maintained over the catalyst. The catalysts so prepared may be used by transfer to the reaction zone for example a stationary catalyst case.

If desired, the catalysts of the present invention may be prepared in situ in the reaction zone through which the reactants are subsequently passed. In some cases an initial portion of the reactants may be employed to aid in the volatilization and sweeping out of the hydrogen halide from the solution and consequently in the precipitation of the metal or metalloid halide.

The catalysts of my invention may be used as suspensions in fluid reactants, that is, in the so-called "fluid catalyst" processes now being introduced commercially.

The product is a highly satisfactory catalyst for reactions of the type enumerated in detail above. It is particularly useful in those reactions where hydrogen chloride or other halide is employed as an activator or promoter such as alkylation, acylation, isomerization, etc., in that small amounts of such hydrogen chloride or other halide may be left in intimate contact with the metal halide in the manner described in the foregoing.

An especially preferred combination employed in carrying out the present invention is aluminum chloride and hydrogen chloride. Following is a typical example of such an embodiment of my invention.

*Example*

By way of example, the preparation of a catalyst comprising anhydrous aluminum chloride on bauxite will be described. A solution of aluminum chloride in liquid anhydrous hydrogen chloride is prepared by dissolving anhydrous aluminum chloride in a slight excess of anhydrous liquefied hydrogen chloride which is held under sufficient pressure to maintain liquid phase. This may conveniently be done at ordinary atmospheric temperatures, although other temperatures may be used if desired. The solution thus formed is then thoroughly mixed with bauxite of a desired particle size, so as to impregnate the bauxite with the solution. The pressure is then released and/or the temperature increased to vaporize the hydrogen chloride, which results in the deposition of aluminum chloride within the pores of the bauxite. The relative proportions of solution and bauxite are chosen to give a catalyst containing any preferred amount of aluminum chloride on the bauxite.

It will be understood that both the hydrogen halide and the metal or metalloid halide should be anhydrous and harmful water should be excluded throughout the process. However, use of a solid adsorbent carrier containing chemically combined water, that is only partially dehydrated, is not precluded in the practice of my invention.

Reference is made to my copending application Serial No. 454,310, filed August 10, 1942, now U. S. Patent 2,356,487 which discloses certain subject matter disclosed and claimed herein and of which this application is therefore a continuation-in-part as to such common subject matter.

I claim:

1. The process of preparing a catalyst which comprises dissolving a normally solid anhydrous metal halide of the Friedel-Crafts type in a liquid anhydrous hydrogen halide, and volatilizing substantially all of the hydrogen halide from the resulting solution by spray drying under conditions to effect precipitation of solid metal halide in the form of finely divided solid particles having intimately associated therewith less than about 5 weight per cent residual hydrogen halide in substantial and effective catalyst-activating amount.

2. The process of claim 1 wherein said metal halide is aluminum chloride and said hydrogen halide is hydrogen chloride.

3. The process of claim 1 in which said solution is spray dried in contact with a finely divided solid adsorbent carrier material having a particle size within the range of about 100 to about 300 mesh, said carrier thereby being impregnated with said metal halide forming a finely divided supported catalyst having residual hydrogen halide associated therewith in substantial and effective catalyst-activating amount.

4. The process of preparing a catalyst which comprises filling the pores of a solid adsorbent particulate carrier material with gaseous anhydrous hydrogen halide, contacting the resulting carrier with a solution of a normally non-gaseous anhydrous halide of the Friedel-Crafts type in a liquid anhydrous hydrogen halide and thereby impregnating said carrier with at least part of said solution, the presence of said gas in said pores facilitating said impregnation, and volatilizing hydrogen halide from the mixture to effect precipitation of said non-gaseous halide in and upon said carrier.

5. The process of preparing a catalyst which comprises filling the pores of a solid adsorbent particulate carrier material with a gaseous anhydrous hydrogen halide, contacting the resulting carrier with a solution of a normally non-gaseous anhydrous halide of the Friedel-Crafts type in a liquid anhydrous hydrogen halide and thereby impregnating said carrier with at least part of said solution, the presence of said gas in said pores facilitating said impregnation, and volatilizing hydrogen halide from the mixture substantially completely by spray drying to effect precipitation of said non-gaseous halide in and upon said carrier.

6. The process of claim 4 wherein said non-gaseous halide is aluminum chloride and said hydrogen halide is hydrogen chloride.

7. The process of claim 5 wherein said non-gaseous halide is aluminum chloride and said hydrogen halide is hydrogen chloride.

JOHN D. UPHAM.